June 12, 1951    T. CARE ET AL    2,556,796
VEHICLE JACK
Filed Sept. 16, 1949

Thomas Care
Frederick Sievern
INVENTORS.

BY Archworth Martin
Attorney

Patented June 12, 1951

2,556,796

UNITED STATES PATENT OFFICE 2,556,796

VEHICLE JACK

Thomas Care and Frederick Sievern,
McKeesport, Pa.

Application September 16, 1949, Serial No. 116,178

2 Claims. (Cl. 254—88)

Our invention relates to lift jacks for motor vehicles and the like, and more particularly to the combination of a lifting jack and centering ramp therefor.

Our invention has for one of its objects the provision of a jack of the character referred to that is provided with a centering ramp which can be placed in front of or behind a vehicle wheel, so that when a wheel is rolled on to the device, the jack will be centered accurately beneath the wheel axle or its housing, the jack being foldable onto the centering ramp when it is not in use.

Another object of our invention is to provide a device of the character referred to wherein an improved means is provided for adjustably locking the jack at various adjusted positions with respect to the ramp.

Figure 1:
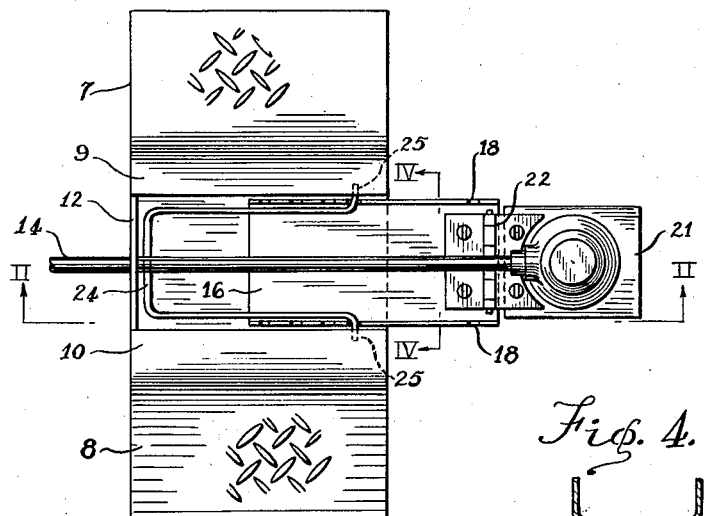
Figure 4:
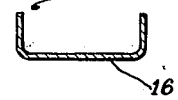
Figure 2:
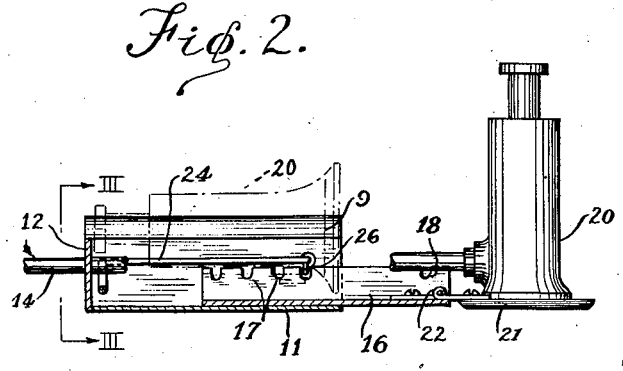
Figure 5:
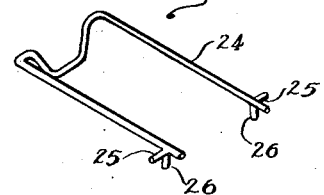
Figure 3:
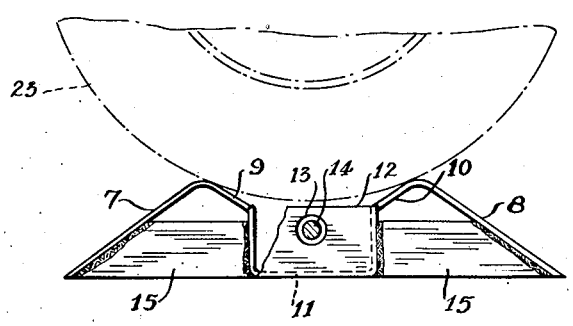

In the accompanying drawing, Figure 1 is a plan view of the device; Fig. 2 is a view taken on the line II—II of Fig. 1; Fig. 3 is an end view of the structure of Fig. 1 showing a vehicle wheel thereon; Fig. 4 is a sectional view of the slide plate taken on the line IV-IV of Fig. 1, and Fig. 5 is a perspective view of the locking lever of Fig. 1, for holding the slide plate and jack at desired adjusted positions.

The centering device comprises a pair of ramps 7 and 8 preferably of sheet metal and bent downwardly at 9 and 10 respectively, the bent-down ends being welded to the flanges of a channel-shaped base plate 11. A bearing plate 12 also is welded to the base plate 11 and its flanges, the plate 12 being provided with a hole 13 through which a jack handle 14 can be inserted to operate a screw jack as hereinafter explained. Stiffening plates 15 are welded to the longitudinal edges of the ramps 7—8 and to the base 11.

The base 11, being of channel form, serves as a support and guide for a slide plate 16 of generally channel form whose upstanding flanges have a series of notches or recesses 17 for use in latching the slide 16 at various adjusted positions. Each of the flanges also has a notch 18 near its outer end.

A jack 20 has its base 21 hingedly connected at 22 to the outer end of the slide 16, the base plate 21 of the jack having its bottom surface flush with the bottom plane of the base 11. The jack may be of conventional form and operated in the usual manner by turning the handle 14 that can be inserted through the bearing plate 12 and into the jack, from a position at the outer side of a vehicle wheel 23.

When it is desired to jack up a vehicle to replace a flat tire, or for any other purpose, the jack will be adjusted to the desired position with respect to the centering device and locked there by a latch lever 24 which has studs 25 that extend into holes in the flanges 9—10, to serve as pivot pins. When the latch lever is raised to its vertical position, the slide member 16 can be adjusted to such positions that when a wheel 23 is on the centering device, the jack will be spaced therefrom such distance as to engage the axle or axle housing at a suitable point. The car owner will, of course, know the proper adjustment to suit his particular make of car. In order to latch the jack at its adjusted position, the handle 24 will be swung downwardly to the position shown in Figs. 1 and 2, at which time spurs or locking lugs 26 thereon will enter a pair of notches 17. The ramps 7—8 will then be placed in front of or behind the wheel 23 and the vehicle moved to bring the wheel into position thereon as shown in Fig. 3. Thereupon, the jack handle 14 will be rotated to elevate the vehicle axle.

When the vehicle has been driven from the centering device, the jack handle 14 will be removed and the latch lever 24 raised to move the lugs 26 from the notches 17. The plate 16 can then be slid into the centering device and the handle 24 again lowered, to bring its locking lugs 26 into the notches 18. Thereupon, the jack will be swung to the dash line position shown in Fig. 3, thus placing the apparatus in a compact condition for storing. When the jack and its centering device are extended somewhat as shown in Figs. 1 and 2, the lever 25 can be used as a carrying handle.

We claim as our invention:

1. A centering device comprising a pair of oppositely disposed ramps having relatively spaced bent-down portions at their adjacent upper ends, to serve as a wheel seat, a base of channel form having its upper edges secured to said bent-down portions, a jack-supporting slide of channel form adjustable in the base channel, in directions transverse to the ramps, the flanges of the slide having notches in their upper edges, and a U-shaped latch lever having its legs pivotally supported in the base flanges and having locking lugs on the legs engageable with said notches, to hold the slide in its adjusted positions.

2. A centering device comprising a pair of oppositely disposed ramps having relatively spaced bent-down portions at their adjacent upper ends, to serve as a wheel seat, a base of channel form having its upper edges secured to said bent-down portions, a jack-supporting slide of channel form adjustable in the base channel, in directions transverse to the ramps, the flanges of the slide having notches in their upper edges, a latch lever pivotally supported in the base flanges and having locking lugs engageable with said notches, to hold the slide in its adjusted positions, and means on the outer end of the slide for hingedly supporting a jack for folding into the slide.

THOMAS CARE.
FREDERICK SIEVERN.

REFERENCES CITED

The following references are of record in the file of this patent:

UNITED STATES PATENTS

| Number | Name | Date |
| --- | --- | --- |
| 2,012,635 | Paden | Aug. 27, 1935 |
| 2,053,646 | Whalen | Sept. 8, 1936 |
| 2,254,149 | Jensen | Aug. 26, 1941 |